US008856383B2

(12) United States Patent
Beninato et al.

(10) Patent No.: US 8,856,383 B2
(45) Date of Patent: Oct. 7, 2014

(54) SYSTEMS AND METHODS FOR CONTROLLING INFORMATION AND USE OF COMMUNICATIONS DEVICES THROUGH A CENTRAL SERVER

(75) Inventors: Joseph M. Beninato, Mountain View, CA (US); Martin Mazner, Menlo Park, CA (US)

(73) Assignee: Presto Services, Inc., Los Altos, CA (US)

( * ) Notice: Subject to any disclaimer, the term of this patent is extended or adjusted under 35 U.S.C. 154(b) by 1174 days.

(21) Appl. No.: 11/134,682

(22) Filed: May 19, 2005

(65) Prior Publication Data

US 2005/0259641 A1    Nov. 24, 2005

Related U.S. Application Data

(60) Provisional application No. 60/573,111, filed on May 20, 2004.

(51) Int. Cl.
| | |
|---|---|
| *G06F 15/173* | (2006.01) |
| *H04M 1/247* | (2006.01) |
| *H04M 1/02* | (2006.01) |
| *H04L 29/08* | (2006.01) |
| *H04L 29/06* | (2006.01) |
| *H04M 1/725* | (2006.01) |
| *H04M 3/42* | (2006.01) |
| *H04W 8/20* | (2009.01) |
| *H04M 3/432* | (2006.01) |

(52) U.S. Cl.
CPC ......... *H04L 67/306* (2013.01); *H04M 1/72536* (2013.01); *H04M 3/42008* (2013.01); *H04M 3/42178* (2013.01); *H04M 1/2474* (2013.01); *H04W 8/20* (2013.01); *H04M 3/42* (2013.01); *H04M 1/0202* (2013.01); *H04M 1/72502* (2013.01); *H04L 69/329* (2013.01); *H04L 67/02* (2013.01); *H04L 67/327* (2013.01); *H04M 3/432* (2013.01); *H04L 29/06* (2013.01)
USPC .......................................... 709/242; 709/224

(58) Field of Classification Search
USPC ..................... 709/226, 229; 607/60
See application file for complete search history.

(56) References Cited

U.S. PATENT DOCUMENTS

| | | | |
|---|---|---|---|
| 6,112,224 A * | 8/2000 | Peifer et al. ................... 709/202 |
| 7,231,258 B2 * | 6/2007 | Moore et al. .................... 607/60 |
| 7,233,978 B2 * | 6/2007 | Overton et al. ............... 709/217 |
| 7,463,930 B2 * | 12/2008 | Housworth et al. ........... 607/60 |
| 2001/0037366 A1 * | 11/2001 | Webb et al. .................... 709/204 |
| 2005/0060202 A1 * | 3/2005 | Taylor et al. ...................... 705/2 |
| 2005/0137631 A1 * | 6/2005 | Yu et al. ............................ 607/9 |
| 2005/0197871 A1 * | 9/2005 | Mendonca et al. ............... 705/7 |
| 2006/0026000 A1 * | 2/2006 | Bodin et al. ............... 704/270.1 |
| 2006/0036134 A1 * | 2/2006 | Tarassenko et al. .......... 600/300 |
| 2006/0173499 A1 * | 8/2006 | Hampton et al. ................. 607/5 |
| 2006/0178707 A1 * | 8/2006 | Thomas et al. ................. 607/30 |

* cited by examiner

*Primary Examiner* — David Lazaro
*Assistant Examiner* — Marie Georges Henry
(74) *Attorney, Agent, or Firm* — Orrick, Herrington & Sutcliffe LLP

(57) ABSTRACT

Communication systems and methods for enhancing communication between users and caregivers, health care providers, and other users via a central processing center. The system comprises a central processing center, including a server, and communication devices such as telephones, pagers, and personal digital assistants. Information programmed into the server by the user can be transmitted to the user's communication devices without requiring the user to input the information into each device separately. Through the system, other parties, such as adult child caregiver to a senior parent, can program information on the senior parent's communication devices. The system also allows users to contact other users with similar interests.

24 Claims, 7 Drawing Sheets

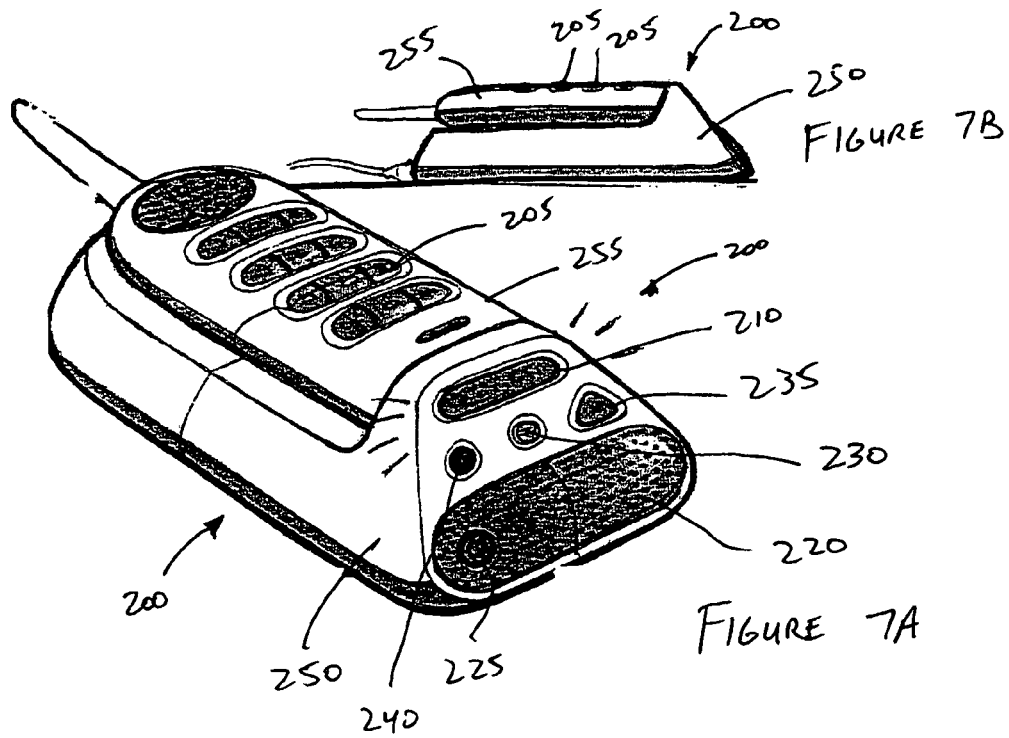
FIGURE 7B
FIGURE 7A
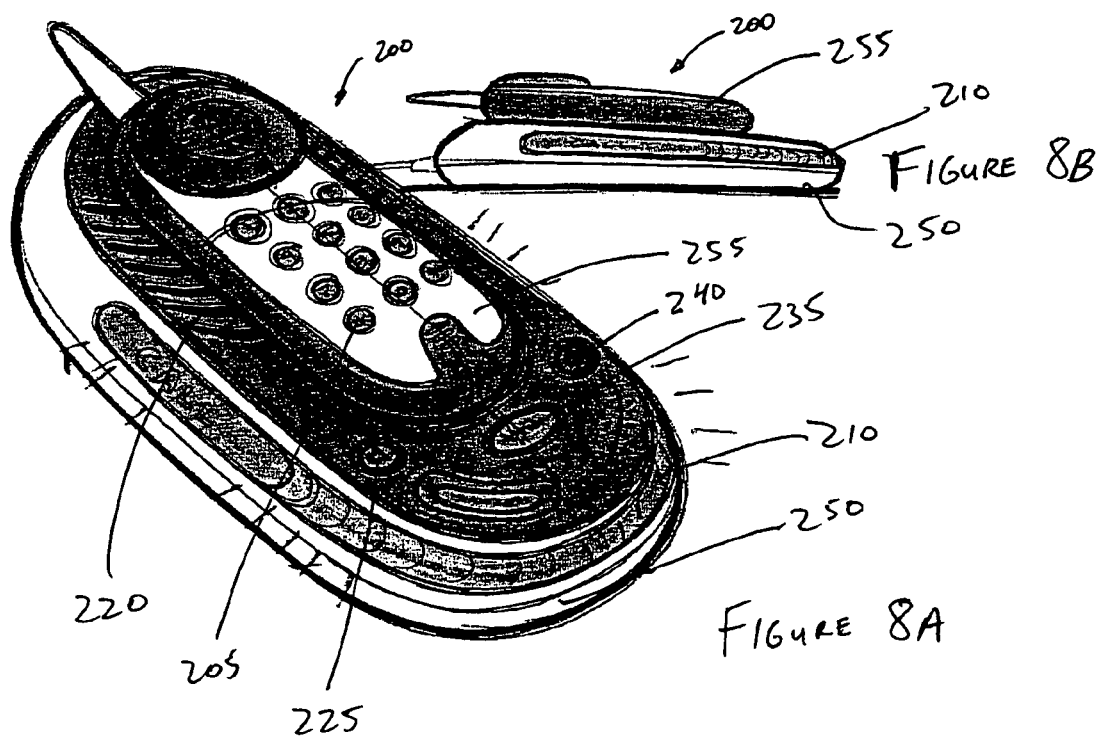
FIGURE 8B
FIGURE 8A

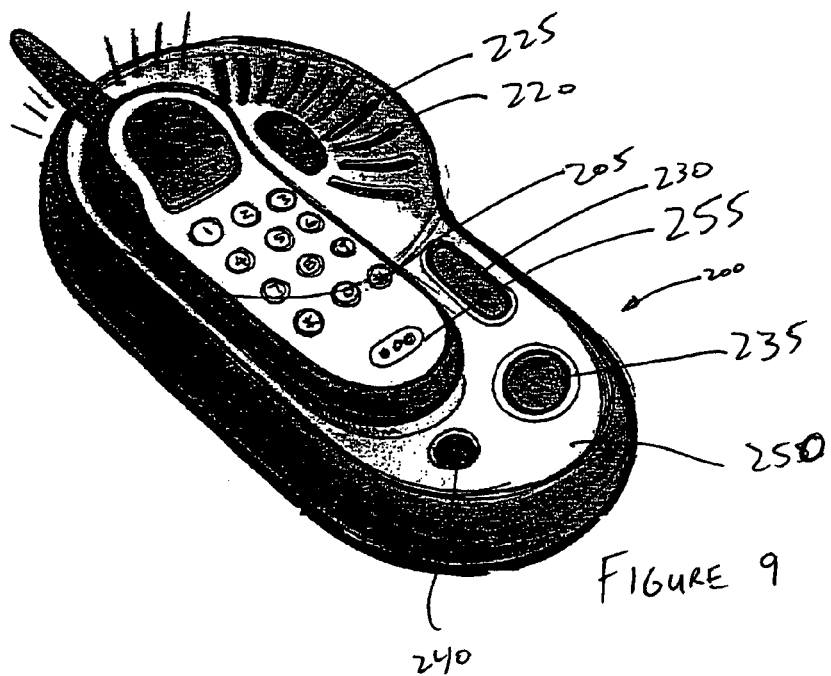
FIGURE 9
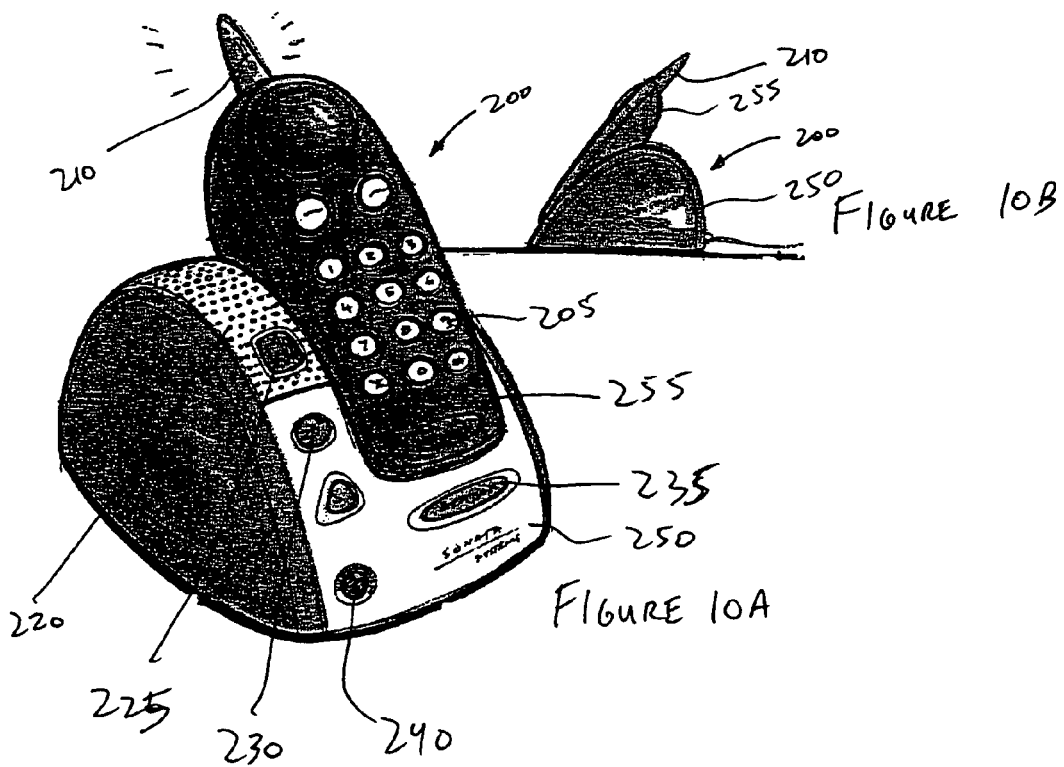
FIGURE 10B
FIGURE 10A

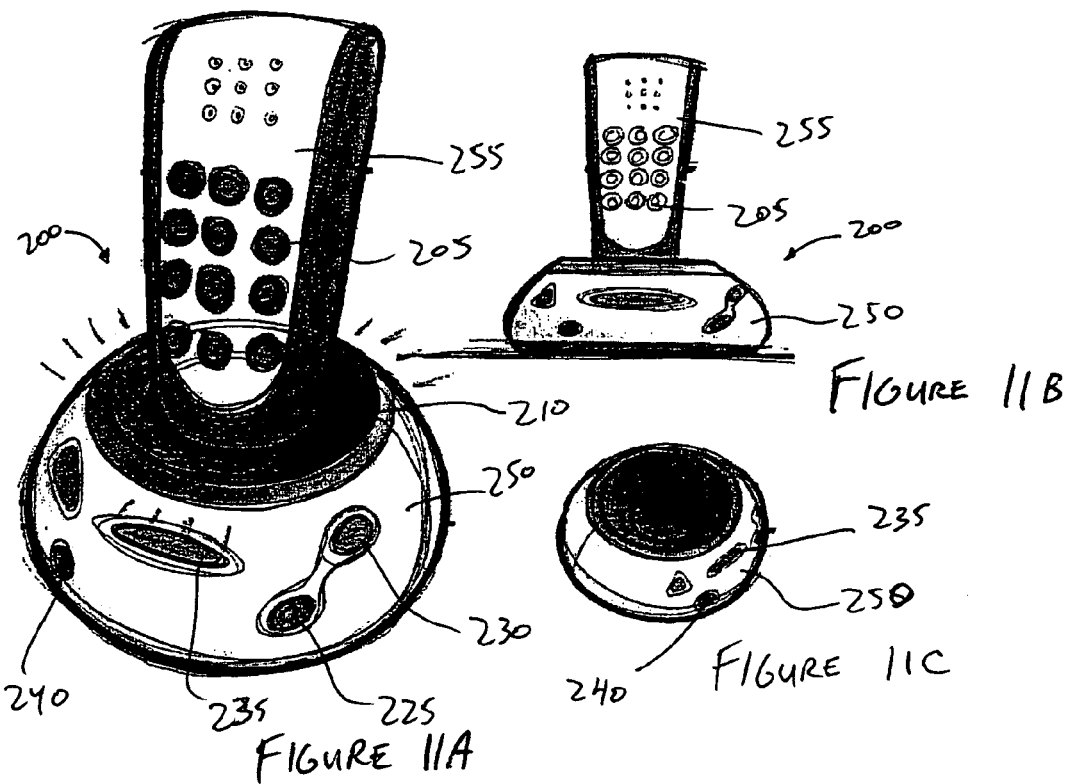
FIGURE 11A
FIGURE 11B
FIGURE 11C
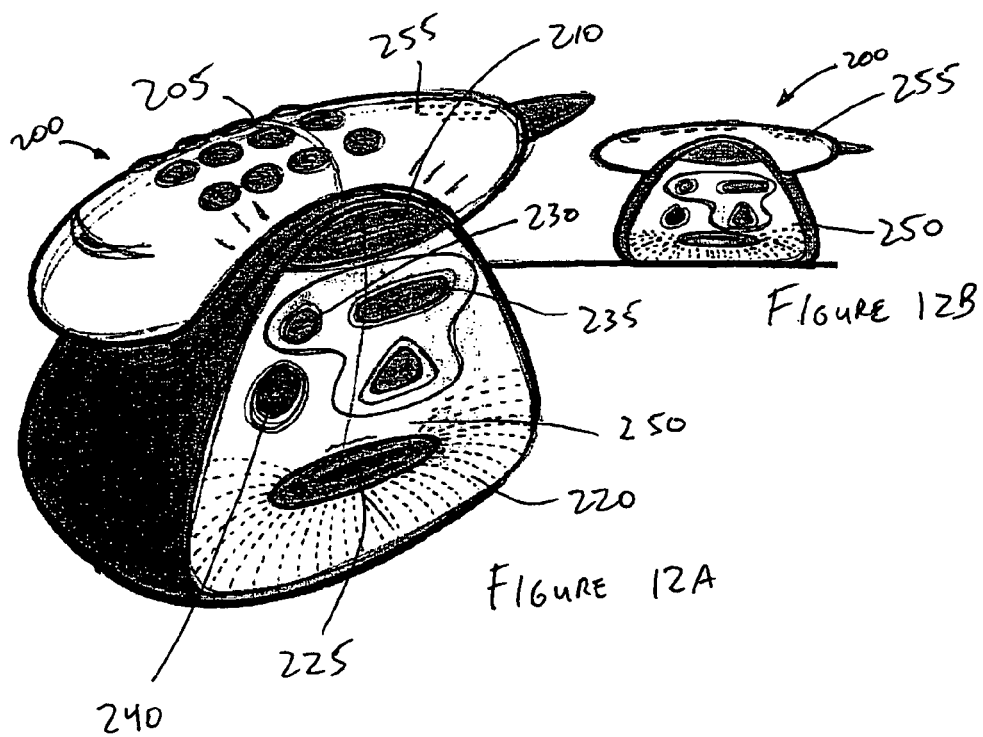
FIGURE 12A
FIGURE 12B

SYSTEMS AND METHODS FOR CONTROLLING INFORMATION AND USE OF COMMUNICATIONS DEVICES THROUGH A CENTRAL SERVER

CROSS REFERENCE TO RELATED PATENT APPLICATIONS

This application claims priority to U.S. provisional application No. 60/573,111, filed May 20, 2004. Priority to this prior application is expressly claimed, and the disclosure incorporated by reference in its entirety.

FIELD

The present invention relates to communication networks and, more particularly, to systems and methods for providing a communication network that is able to link all of a user's communication devices and facilitate communications between a user and caregivers, health care providers, and other parties.

BACKGROUND

Users of communication devices such as cellular phones, pagers, personal digital assistants often need to access the memory of the various devices to input new contacts, add calendar items, and revise or add other information. Often a user is required to input information on each device individually, which may require an appreciable amount of time. Current systems are available to transfer information from one device to another, but these systems may be difficult to operate for many users who lack experience with computers or other technology. Therefore, a need exists for a system that facilitates programming of such information to affect all of a user's various devices without the need to input the information individually on each device. In addition, a need exists for a system that allows another party, such as a caregiver, to program such information on the communication devices of the user. Furthermore, the need exists for an enhanced communication system to allow users to more easily contact health care providers, caregivers, and other parties.

SUMMARY

The present invention is directed, in general, at a system that facilitates communication between users and caregivers, health care providers, and other parties by connecting the parties through a call-processing center. The call-processing center includes a server that can be used to store, revise, and program information for the user's account. The user, caregiver, or health care provider can program information onto the server in a variety of manners including calling a help desk, using a web browser, or using the communication device directly. Once the information is programmed, the server can transfer the information to all of the communication devices in the user's account if desired.

The present system can also enhance communication between a user and his or her caregiver or health care provider. The system can allow for a caregiver or health care provider to access a user's account to transmit information to the server such as contact information, appointment reminders, and prescription reminders. This information could then be transferred from the server to one or more of the user's communication devices, and the user could receive alerts in advance of the scheduled appointment and/or reminders to take newly prescribed medication.

In further embodiments, the system includes a call linking-center that can be used to connect people with similar interests. For example, a user of this system can indicate a desire to speak to another party regarding a specific topic. The call linking-center could then evaluate its records for another party with similar interests and connect this person to the user. In addition, the call linking-center could be used to meet new contacts by connecting people based on a variety of factors such as geography, time of day, or other parameters.

The system can also allow for uploading of information regarding the user's medical conditions and/or environmental conditions. Devices, such as heart rate monitors, and sensors, such as smoke detectors, can be linked to the user's communication device and thereby transmit information to the server. This information can then be processed by the server and directed to a party of interest such as the user's caregiver or the fire department.

The communication devices used in conjunction with the present system can also include one or more features to facilitate usage by persons with sensory or physical disabilities. For example, the communication devices can include features such as a snooze option or a synthesized voice feature to announce the time or which button has been depressed by the user.

Other systems, methods, features and advantages of the invention will be or will become apparent to one with skill in the art upon examination of the following figures and description.

DESCRIPTION OF THE DRAWINGS

Preferred embodiments are illustrated by way of example, and not by way of limitation, in the figures of the accompanying drawings, in which like reference numerals refer to like components.

FIG. 7A is a perspective view of a telephone that can be used in conjunction with the present system.

FIG. 7B is a side view of the telephone of FIG. 7A.

FIG. 8A is a perspective view of an alternative embodiment of a telephone that can be used in conjunction with the present system.

FIG. 8B is a side view of the telephone of FIG. 8A.

FIG. 9 is a perspective view of an alternative embodiment of a telephone that can be used in conjunction with the present system.

FIG. 10A is a perspective view of an alternative embodiment of a telephone that can be used in conjunction with the present system.

FIG. 10B is a side view of the telephone of FIG. 10A.

FIG. 11A is a perspective view of an alternative embodiment of a telephone that can be used in conjunction with the present system.

FIG. 11B is a front view of the telephone of FIG. 11A.

FIG. 11C is a perspective view of the base station of the telephone of FIG. 11A.

FIG. 12A is a perspective view of an alternative embodiment of a telephone that can be used in conjunction with the present system.

FIG. 12B is a side front view of the telephone of FIG. 12A.

DETAILED DESCRIPTION

Figure 1:
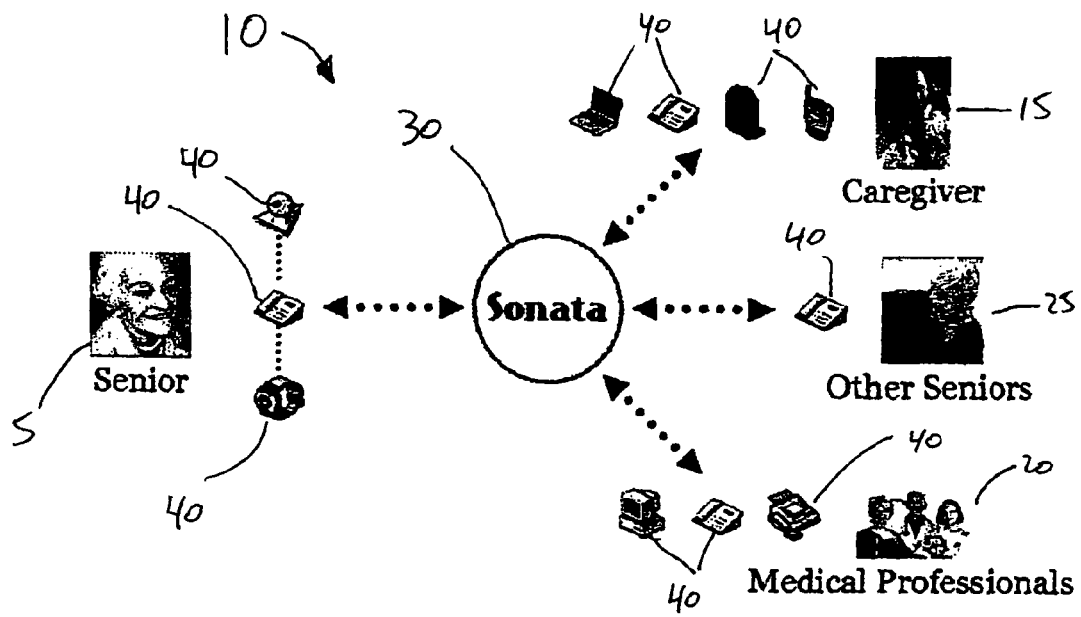
FIG. 1 is a schematic of the communications system of the present invention showing connections between the user, call-processing center and other parties.

The present system comprises a call-processing center and one or more communication devices. As shown in FIG. 1, the system 10 provides a means for connecting users 5 to caregivers 15, medical professionals or health care providers 20, other users 25, and commercial businesses, including but not limited to medical equipment providers, pharmacies, financial service providers, and the like. The system 10 also allows a user 5, caregiver 15 or other party to program one or more communication devices 40 via a call-processing center 30. For example, the caregiver 15 may an adult child of a senior, who, via the system 10, is able to program reminders, alerts, contact information, etc. onto the telephone and other communication devices 40 of his or her senior parent. Although the examples provided are generally directed at users who are senior citizens, the invention is not limited to use by seniors and is equally applicable to all persons. Likewise, users 5 can be connected to any type of business, other parties or networks beyond the examples provided.

The systems and methods disclosed herein can be used with any form of micro-processor based devices including, but not limited to, corded or cordless telephones and answering machines, cellular phones, personal digital assistants, desktop and/or laptop computers, medical monitoring equipment, wristwatches, pagers, clock radios, and the like, hereinafter referred to generically as "communication devices" 40. As is discussed further below, the communication device 40 can include one or more features that add functionality to the communication device 40 and/or facilitate usage of the communication device 40.

Figure 2:
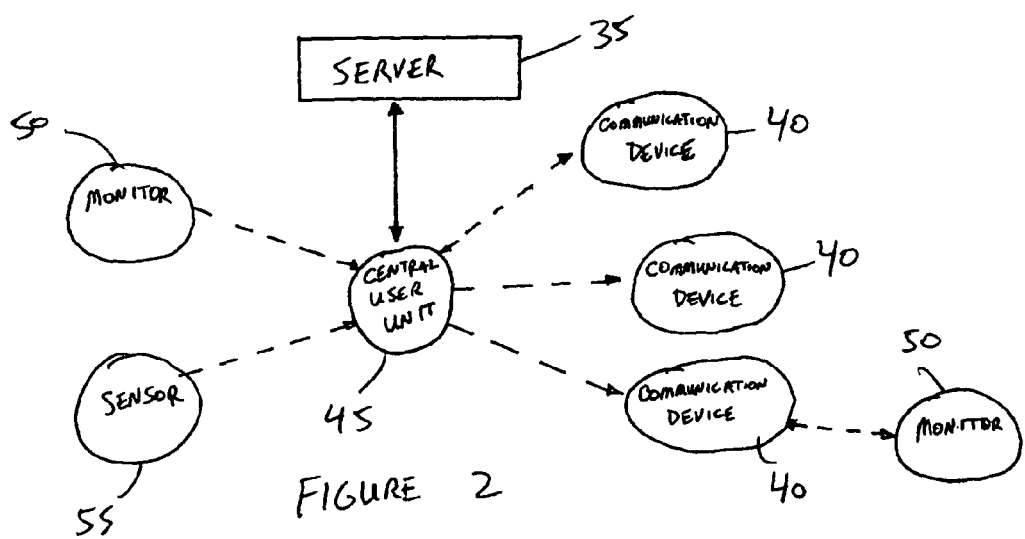
FIG. 2 is a schematic of the communications system of the present invention showing connections between the server and the user's communication devices and other devices.

The call-processing center 30 comprises a server 35 that communicates with the communication devices via a modem, wireless network, or other means known in the art (FIG. 2). The server 35 stores information regarding the user and user's account such as the user's contact information, user settings, and names of relatives, health care providers, friends, etc. In a further embodiment, the call-processing center 30 can also include an automated and/or live-operator help desk that can assist users 5 or other parties in operating the system. For example, if a user 5 is experiencing difficulty accessing the server to input new information, the help desk can assist the user 5 in entering the information. The help desk can also include a concierge service to assist users with a variety of issues including billing issues and other support services. As described further below, the call-processing center 30 operates as a conduit between a user 5 and businesses or other parties based on the needs of the user. Via the call-processing center 30, the communication devices 40 of one user can be linked with other parties, provide alerts, and/or monitor the user's health and environmental conditions.

In a preferred embodiment, the server 35 of the present system is capable of transmitting a message to a communication device 40 via a variety of mechanisms such as a telephone call, email, message accessed via web browser, pager networks, short message service (SMS), and the like. For example, the server 35 could send reminders to the user 5 based on calendar items inputted by the user. To acknowledge receipt of the reminder, the user 5 could depress a specific keypad button, respond via email, or otherwise communicate with the server 35. The server 35 could then remove the alert from the user's communication devices 40. In a further embodiment, the server 35 can be configured to transmit the alert to the user's primary telephone number initially. Then, if receipt of the alert is not acknowledged within a specified time, the server can transmit an alert to a wider array of the user's communication devices 40 and/or other parties.

In a preferred embodiment, the system 10 comprises a communication device 40 that operates as a central user unit 45. The central user unit 45 is preferably connected to a modem via a direct link or a wireless network to allow for communication between the central user unit 45 and the server 35 at any time. For example, the central user unit 45 can be a cordless telephone and answering machine within the user's home connected via a modem to the server 35 of the call-processing center 30. Alternatively, the central user unit 45 can be connected to the server 35 periodically as desired by the user. Preferably, the central user unit 45 communicates with the server 35, e.g. by dialing into the server 35, on a regular basis such as daily, hourly, etc. Other communication devices 40 can be connected to the central user unit 45 and/or connected via a modem or wireless network to the server 35 to obtain and/or transmit information. For example, the communication devices 40 can include processors, which allow for wireless communication with the server via the central user unit 45, a wireless hotspot, or another communication device in the system 10. When information has been uploaded to the server as described below, the server 35 will transmit this new or revised information to the communication devices 40 linked to the user's account. The information can be transmitted to the user's communication devices 40 directly from the server 35 and/or from the server 35 via the central user unit 45.

The present system allows for the programming of one or more communication devices 40 by transmitting information to the server 35 of the call-processing center 30. Information can be programmed by the user 5 or any other party granted access to the user's account such as an adult child caregiver 15 or health care provider 20. The system allows for programming of several features including information regarding contacts, calendar events, and configuration parameters such as ring or alert tones and/or volumes, speed dial keys, the user's outgoing answering message, etc. Once the user 5, caregiver 15, or other party has provided the programming information, the new settings or information can be transferred to all communication devices 40 in the user's account if desired.

Figure 3:
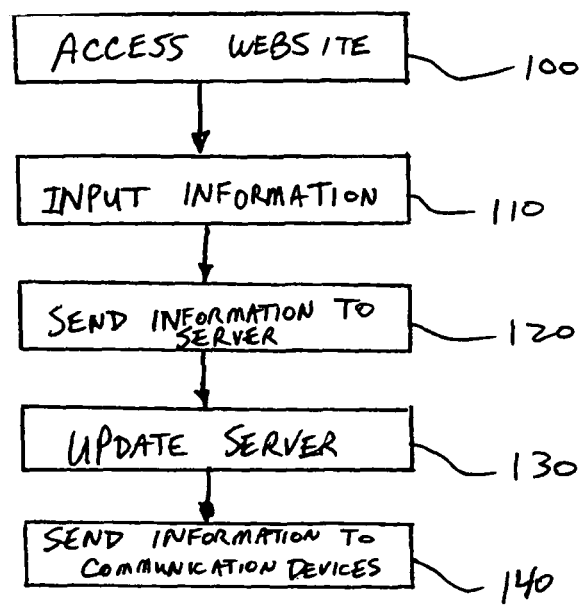
FIG. 3 a flow chart showing a method of programming information.

In one embodiment, a user 5 or caregiver 15 can access a website to program the user's communication device 40, add or revise information, or perform other functions. For example, an adult child caregiver 15 with access to his or her senior parent's account could access the website to add information regarding a new contact. The information can include telephone numbers, address(es), birthday, hobbies and interests, email address, business information, reminders, calendar events, and other desired information. The caregiver 15 would access the website in step 100 (FIG. 3). In step 110, the caregiver 15 can input the information for the new contact. The caregiver 15 can then confirm the accuracy of the information and finalize the entry for processing in step 120. The website can then communicate with the server 35 to update the information on the server 35 at step 130. The server 35 can then transmit this information (step 140) to the senior parent's central user unit 45 and/or one or more of the senior parent's communication devices 40. The communication devices 40 would then be programmed with the contact information for the new contact, as appropriate. For example, the senior parent's cell phone can be programmed to include the new contact's phone number and address, but not information concerning his or her e-mail address, birthday, hobbies and/or interests. The senior parent's other communication devices can obtain other subsets of the information, or the entire set of available information as desired.

The communications system 10 can also be programmed by dialing into the help desk to make changes to the communication device 40 and/or user's account. The help desk could include an automated system, a live operator system, or a combination of both. The user 5 can also program the communication device 40 by using the communication device's keypad to access menus directly on the communication device 40 to change features on the phone, add contact information, etc. In this embodiment, if a user 5 enters new information on a single communication device 40, the server 35 can automatically update the user's remaining communication devices 40. The server 35 first obtains the information from the communication device 40 on which the user 5 inputs the information when the user dials into the server 35 with that communication device 40 or otherwise connects with the server 35 (e.g. via a wireless hotspot, central user unit 45, or other communication device 40). The server 35 can then process and store this new information and transmit it to each of the user's remaining communication devices 40. The update can occur automatically if the communication device 40 is connected to the server 35 by a wireless hotspot, direct link, or other means described above. Alternatively, the update can occur on a particular communication device 40 the next time the user 5 accesses the server 35 with that communication device 40.

In yet another method of programming the communication device 40, a user 5 or caregiver 15 can access the central user unit 45 from another communication device 40. Following voice prompts and/or using touchtone buttons, the user 5 or caregiver 15 could transfer information to the central user unit 45. The central user unit 45 could then transmit this information to the server 35 and other communication devices 40 via a modem or wireless network as described above.

The communication system 10 can also be used to increase communications between a user 5 and a health care provider 20 and/or other parties or businesses by allowing a more direct and convenient link between the user and the desired party. As described above, the system 10 facilitates entry of contact information and setting of speed dial codes that can assist a user in establishing contact with another party. In addition, the user 5 can contact the help desk at the call-processing center 30 to be connected to the desired party. Such a system is easier than a standard operator or information directory because the help desk could have personal information regarding the user such as names of relatives, health care providers, friends, etc.

As discussed above, in a preferred embodiment, another party can access a user's account to input information that is then transmitted to the user's communication devices 40. The system allows another party, such as an adult child caregiver to a senior parent, to remotely control the user's communication devices 40. The caregiver 15 can input information or settings for the communication device 40 such as setting up appointment reminders, recording messages to be played at a specified time, setting speed dial buttons, changing the outgoing message, etc. In a further embodiment, if the caregiver 15 or other party programs a reminder or alert on the user's communication devices 40, the user 5 can acknowledge receipt of the reminder by depressing a button or selecting a menu item on the communication device 40. Preferably, this acknowledgement of receipt could then be communicated by the system to the caregiver 15. If the user does not acknowledge receipt within a specified period of time, an alert could be sent to the caregiver 15 or other parties.

Figure 5:
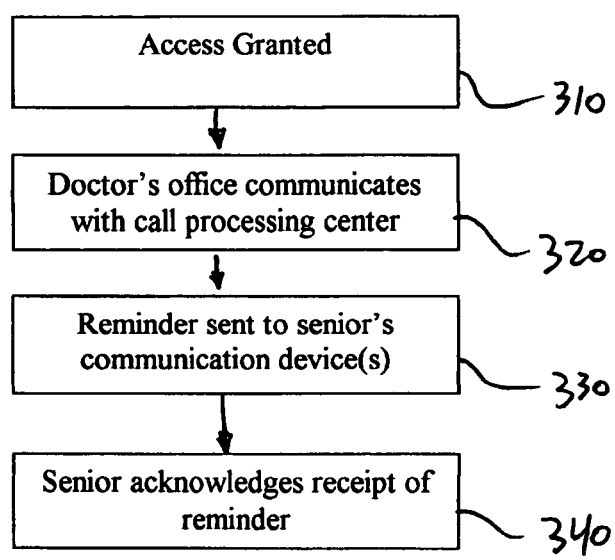
FIG. 5 is a flow chart showing a method of programming information on another user's communication device.

In this embodiment, the user 5 would designate individuals or groups that would be granted access to the account (step 310—FIG. 5). In addition, certain organizations or persons, such as health care providers 20, could be granted access to a user's account, upon proof that the user 5 is a patient of the health care provider 20. In this embodiment, for example, a health care provider 20 to a senior could access the senior's account to program a reminder of an upcoming appointment and/or other information. For instance, if the senior attends an initial office visit and the doctor determines that a follow-up visit would be advisable, the doctor's office could then communicate with the call-processing center 30 to input information regarding the doctor's contact information and the date and time of the scheduled follow-up appointment (step 320). In step 330, at the a pre-selected time in advance of the appointment, the senior would receive a message, alarm, or other indication on one or more of the senior's communication devices 40 as a reminder of the appointment. The senior would then acknowledge receipt of the alert or reminder at step 340. If the senior had reason to cancel the appointment, or required more information, the health care provider's contact information would be readily accessible.

As a further example, this system could also be used to remind a senior of the need to fill a new prescription and/or to take a newly prescribed medication at a particular time. If the prescription calls for the senior to take a pill twice daily, for example, the communication device 40 could be programmed by the health care provider to send an alert at 8 a.m. and 6 p.m. Preferably, the senior could acknowledge receipt of the alert by depressing a button and/or selecting a menu item. Acknowledgement of the alert can then be sent to the server 35 to disable the alert. If the senior does not acknowledge receipt, the server 35 can transmit an alert to a wider array of the senior's communication devices 40. In a further embodiment, the server 35 can also communicate with a caregiver 15, health care provider 20 or other party to indicate whether the senior has acknowledged receipt of the alert.

Figure 4:
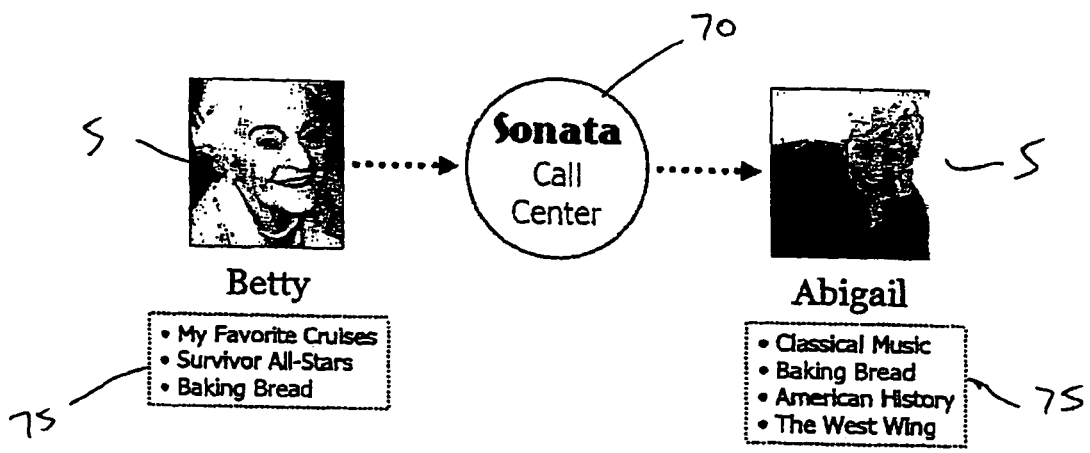
FIG. 4 is a schematic of the call center system of the present invention.

In yet another embodiment, as shown in FIG. 4, the call-processing center 30 can include a call linking-center 70 that allows for user's with similar interests 75, etc. to be directly connected based on characteristics evaluated by the call linking-center 70, server 35 or other processing unit. The user's communication device 40 can be connected with another party's communication device 40 by depressing button(s) or selecting a menu item on the communication device 40. The call linking-center 70 can then connect two users based on a variety of factors or characteristics such as geography, common topics of interest, time of the day, or other parameters. The call linking-center can "match" two users based on a comparison of the users profiles (i.e. interests, gender, geography, time of day availability, etc.), or the user 5 can select the particular parameters of the party with whom he or she would like to be connected. In addition, the user 5 can contact a live operator at the call linking-center 70 to obtain information regarding potential contacts. The user 5 can also access information regarding other users via web sites or through menu options on the communication device itself.

Figure 6:
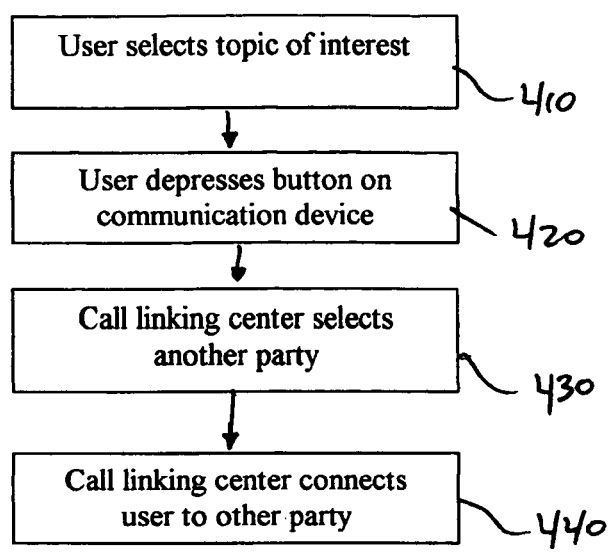
FIG. 6 is a flow chart showing a method of linking user's based on characteristics selected by a user.

In a preferred embodiment, the user could also select a topic about which he or she would like to contact a person as shown in FIG. 6 (step 410). The user could select the topic from a list programmed onto the communication device 40 by the user or add a new topic and then depress the designated button(s) or select the appropriate menu item on the communication device 40 at step 420. The topic list can be stored locally on the communication device 40 or be programmed onto the server 35 by the methods described above. The call linking-center 70 could then select a party who shares an interest in or has experience with that topic to receive the call at step 430 and connect the user 5 to that party at step 440. In a further step, the call linking-center 70 can ensure that the other party answers the phone before connecting the user. If the other party is not available, the call linking-center 70 could then attempt to reach another party on the list, and so on, until someone answers. The call linking-center 70 could also be used to find another party having one or more common interests who is currently available and connect the user to this other party. This allows users to meet new contacts with some shared interests, but also with potentially diverse interests.

The communication device 40 can also be programmed with a specific list of phone numbers from which the user opts to receive phone calls and/or a list of phone numbers that the user wishes to block incoming calls. The user 5 can program this information onto the server 35 as described above so that the user's phone number designations are stored on each of the user's communication devices 40. The user's designation of desired or undesired phone numbers can be based on the caller's telephone number, area code and/or telephone exchange (the second three digits in a 10 digit telephone number). If the phone number is blocked, the call would not ring the user's communication device 40 nor be directed to the user's answering machine. Alternatively, the user could designate phone numbers that will be directed straight to an answering machine rather than being completely blocked. For example, if a user completes a telephone call with a person she did not enjoy speaking with, she can place that person on a block, or undesirable, list to prevent future calls from that person. On the other hand, after an enjoyable conversation with another person, the user could add that person to a favorites list that can be accessed for future calls.

In yet another embodiment, a user 5 can store phone numbers or other contact information of potential matching users on the communication device 40 based on prior communications with the other party or parameters provided to call center. The list of phone numbers can be programmed onto the server 35 by the methods described above. The user could then directly contact a person on the list as selected by the user. In a further embodiment, the call linking-center 70 can select a person from the list based on a variety of factors including geography, topics of interest, time of day, availability, or other parameters evaluated by the call center.

In yet another embodiment, a user 5 of the system is able to designate whether he or she is currently available or not available. Preferably, the user can designate availability as to certain topics and not to others as desired. In addition, the user 5 can designate specific times during the day in which he or she is available. The server 35 can store information regarding the availability of the user 5 and transmit this information to other user's when the information is requested. In a further embodiment, a button or display on the communication device 40 can indicate whether another specific person, such as a person on the user's "favorites" list, is currently available or not available.

Returning to FIG. 2, the communication device 40 can also comprise expansion ports that allow other devices to be connected to the communication device 40 for the transfer of data and/or power. Examples include medical monitoring equipment 50 like blood pressure monitors, pulse oximeters, blood glucose monitors, body temperature sensors, body weight scales, heart rate monitors, and the like. Data derived from these devices can be forwarded by the system to a desired recipient. The information can be sent from the communication device to the server and then transferred from the server to a desired recipient. For example, the user's health care provider may desire information regarding the user's blood pressure following an office visit. The user could connect a heart rate monitor to the communication device 40. The system would then upload this information from the communication device 40 to the server 35, and the server 35 could then forward this information to the health care provider for analysis.

The communication device can also be attached and/or include wired or wireless environmental sensors 55. The communication device 40 can serve as a base station for a variety of wired or wireless environmental sensors 55 including video cameras, motion sensors, air temperature sensors, smoke or fire detectors, carbon monoxide sensors, radon detectors, noise sensors and the like. If these sensors detect an adverse event, the communication device 40 can transmit an alert message to the server 35. The server 35 can then send an alert to the user's other communication devices 40 to notify the user 5 of the adverse event. In addition, the server 35 could transmit information regarding the adverse event to a caregiver 15 and/or the proper authorities. For example, if the sensors detect a high level of carbon monoxide, the communication device could send a signal to the server 35 that a dangerous condition exists. The server could then initiate an alarm on all or some of the user's linked communication devices 40 to notify the user 5 of the condition. The server 35 could also contact the local fire department to notify them of the event.

The system can further include an urgent call tree system. For example, a user can program in the numbers of relatives in an order based on any desired parameters such as geographic proximity, age, relationship, etc. If the user desires to speak to a relative immediately, such as in an emergency situation, the user could activate the urgent call tree system by depressing a button and/or selecting a menu item. The urgent call tree system would then dial the numbers from the list in order until a live person is reached.

Other systems and features can be added to the communications system 10 and/or communication devices 40 to further assist the user. The communication device 40 can comprise features to assist a senior or user with physical or sensory limitations in using the device such as large button keypads, a raised central key (such as the "5" key on a telephone keypad), and compatibility with hearing aids.

As shown in FIGS. 7-12, a cordless telephone 200, including a base station 250 and cordless handset 255, used in conjunction with the present system preferably includes several features to facilitate use. For example, the cordless handset 255 typically is docked in the base station 250 such that the keypad buttons 205 are facing up and/or angled towards the user 5. This allows the user 5 to dial on the cordless handset 255 while the cordless handset 250 is still docked in the base station 250. In a further embodiment, the base station 250 can include a visible indicator 210, such as a flashing light, that is activated when the telephone is ringing or receiving a message. In further embodiments, the visible indicator 210 can be disposed directly on the cordless handset 255 (FIG. 9), or it can be disposed on the antenna as shown in FIGS. 10A and 10B. Preferably, the visible indicator 210 is visible from all or nearly all sides of the base station 250 or cordless handset 255. In a further embodiment, the telephone 200 comprises a large speakerphone 220 and speakerphone button 225 to allow a user 5 to operate the telephone 200 hands-free.

In a further embodiment, the telephone 200 can comprise one or more buttons to activate specific features of the telephone 200. For example, the telephone 200 can comprise one or more emergency speed dial or alert buttons 240. The emergency button 240 could be programmed to contact the fire department, an ambulance, the police, or any other desired emergency contact. Preferably, the emergency button 240 is a depressed button rather than a raised button to prevent inadvertent activation of an emergency call. In a further embodiment, the telephone 200 can comprise one or more action buttons 235 that can be used in conjunction with a variety of features such as menus, speed dial, help desk assistance, etc.

The communication device 40 can comprise several features designed to accommodate users with hearing problems. In addition, volume adjustments can be made to different portions of the communication devices 40 such as the ringer, handset, speakerphone and the like on the communication device 40 itself or by using the programming methods described above. The communication device 40 preferably includes a volume level memory that would remember the user's desired volume levels after each call. In addition, an internal battery within the communication device 40 can be used to retain the stored adjustments in case of a power failure.

In a further embodiment, the volume levels of the communication device 40 can be adjusted remotely by a caller to the communication device user. In this embodiment, a caller would be able to depress a touch-tone button on his or her phone that remotely increases or decreases the handset volume on the user's communication device 40. The communication device would recognize the touch-tone and the appropriate volume adjustment would be made. This can assist callers to seniors if the senior is unable to properly adjust the volume as needed. In this case, the caller could remotely adjust the volume of the senior's communication device to an optimal level.

The communication device 40 can comprise a high quality speaker and/or microphone to assist the user in communicating with another party. Use of a high quality speaker can assist the hearing impaired with understanding another person because of a reduction in background noise or other interference that is common with lower quality speakers. Furthermore, a higher quality microphone can assist communications with another party by providing greater clarity to the speaker's voice.

The communication device 40 can further comprise one or features to assist the visually impaired. In addition to the large and/or raised keypads, the communication device can include a synthesized voice to announce over the speaker which button has depressed by the user. The user can activate this feature by depressing a preselected button, menu item, and/or programming the communication device. This feature would assist users who have difficulty in seeing the keypad or dialing accurately. The communication device can also include a button or menu item that activates a synthesized voice to announce the time, day and date over the speaker.

Each of the communication devices 40 can also comprise a "find" feature similar to those found in conjunction with cordless phones. In addition to being able to depress a "find" feature on a base unit, a user 5 would be able to remotely locate his or her communication devices 40 by depressing certain touch-tones or selecting a menu item. The communication device 40 can also have a reset feature that can disable a phone if it is left off the hook for a specified period of time.

The communication device 40 can comprise one or more features that allow for remote access to and/or control of another user's communication device 40. In addition to the ability to control another user's volume levels, the present system preferably allows another user to access the incoming/outgoing caller ID logs of a user. Preferably, access to such records would be restricted to only those persons granted authority by the user. In addition, a remote caller could enter a code to remotely take the communication device off hook and speak over the communication device's speakerphone. This could be used to contact a person that is otherwise unable to reach the phone.

The communication device 40 can further comprise a snooze feature that can be used to turn off the ringer and/or other alert. In one embodiment, the communication device 40 would comprise a button 230 (FIGS. 7-12) or menu item that allows for the user to directly place the communication device in a snooze mode. Additionally, the user 5 or caregiver 15 could program the communication device to be in a snooze mode via the programming methods described above. For example, the user 5 could program a schedule that all devices are in snooze mode during a specified time each day, for example from 10 p.m. to 6 a.m. The snooze mode could also turn off the ringer for a specified period of time, during which all incoming calls would be silently forwarded to the user's answering machine, inbox or other message storage location. In a further embodiment, the snooze feature of the communication device could be overriden by a caller by entering an override code.

In a further embodiment, the present system includes one or more remote control devices that can be used to communicate via the communication device 40. The remote control device can take the form of a piece of jewelry (such as a watch, pendant, etc.) or be located somewhere else in the home. The remote control device can be used to take the phone off the hook and dial a phone number. For example, the remote control device can comprise one or more emergency call buttons. When the button is depressed, the closest or most accessible communication device 40 would be taken off hook and dial the designated phone number. The user could then communicate via the communication device's speakerphone, or in a further embodiment, via a speaker and microphone integrated into the remote control device.

The system can further comprise an activity or inactivity timer within one or more of the user's communication devices. The timer can include a controllable timeout and an automatic motion sensor. The communication device can be programmed to initiate a call depending upon a specified set of indications including incoming calls being answered, outgoing calls being initiated, activation of the motion sensor, etc. The call can be initiated for multiple reasons including no activity detected in a specified time period, or some activity indicated. The communication device can contact a remote call sensor, and a synthesized voice can automatically indicate to the call-processing center 30 that no activity had occurred for a specified time. Alternatively, a call or data transmission can be directed to the server. The call-processing center 30 and/or server 35 could then attempt to contact the user 5 by calling or sending an alert to one or more of the user's communication devices 40. If the user 5 fails to acknowledge receipt of the alert or answer the communication device 40, then the system can send an alert to a caregiver 15, health care provider 20 or other party to inform them that a possible adverse event is happening.

The communication device 40 can also include games that can be played by the user. For example, the communication device can include various games of skill or chance based upon the user pressing a specific button or series of buttons on the phone.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

We claim:

1. A method of updating information on one or more of a first party's plurality of communications devices comprising:
   establishing an individual user account for the first party on a call-processing system, the call-processing system being operably coupled to the first party's plurality of communication devices; wherein updated information is processed by a central server;
   granting a second party access to the first party's account, wherein the second party comprises a caregiver associated with the first party and wherein access to the first party's account is restricted to only persons granted authority by the first party or the second party;
   receiving information from the second party at a central server of the call-processing system, wherein the information comprises device configuration parameters to be applied to current features of the one or more of the first party's plurality of communication devices;
   transmitting the information from the central server to one or more of the first party's plurality of communication devices to update the information contained on one or more of the first party's plurality of communication devices; wherein the central server initiates an alert on all or some of the first party's linked communication devices to notify the first party of the updated information made at the central server;
   wherein the first party's plurality of communication devices are selected from the group consisting of corded telephones, cordless telephones, answering machines, cellular phones, personal digital assistants, desktop computers, laptop computers, wristwatches, pagers, and clock radios; and
   wherein the device configuration parameters are selected from the group consisting of information regarding contacts, calendar events, reminders, alerts, ring or alert tones, volumes, snooze parameters, speed dial keys, and outgoing answering messages.

2. The method of claim 1, wherein the step of inputting comprises accessing a website linked to the central server.

3. The method of claim 1, wherein the step of inputting comprises the second party inputting a series of touch-tone commands on a communication device.

4. The method of claim 1, wherein the step of inputting comprises the second party inputting a series of responses in response to voice prompts.

5. The method of claim 1, wherein the step of inputting information comprises the second party communicating with a help desk of the call-processing system.

6. The method of claim 5, wherein the help desk comprises a live operator.

7. The method of claim 5, wherein the help desk comprises an automated system.

8. A method of updating information on one or more of a first party's plurality of communications devices comprising:
   establishing an individual user account for the first party on a call-processing system, the call-processing system being operably coupled to the first party's plurality of communication devices;
   granting a second party access to the first party's account; wherein the second party comprises a caregiver associated with the first party and wherein access to the first party's account is restricted to only persons granted authority by the first party or the second party;
   receiving information from the second party to a central server of the call-processing system; and transmitting the information from the central server to one or more of the first party's plurality of communication devices to update the information contained on one or more of the first party's plurality of communication devices; wherein the central server initiates an alert on all or some of the first party's linked communication devices to notify the first party of the updated information made at the central server; wherein the information comprises device configuration parameters to be applied to current features of the one or more of the first party's plurality of communication devices, and wherein the step of transmitting the information includes transmitting the information to a first one of the first party's plurality of communication devices and transmitting the information to a second one of the first party's plurality of communication devices if confirmation is not received from the first party within a predetermined period of time;
   wherein the first party's plurality of communication devices are selected from the group consisting of corded telephones, cordless telephones, answering machines, cellular phones, personal digital assistants, desktop computers, laptop computers, wristwatches, pagers, and clock radios; and
   wherein the information is selected from the group consisting of information regarding contacts, calendar events, reminders, alerts, ring or alert tones, volumes, snooze parameters, speed dial keys, and outgoing answering messages.

9. The method of claim 8, further comprising the step of sending an alert to a third party if confirmation is not received from the first party within a predetermined period of time.

10. The method of claim 8, wherein the step of inputting comprises accessing a website linked to the central server.

11. The method of claim 8, wherein the step of inputting comprises the second party inputting a series of touch-tone commands on a communication device.

12. The method of claim 8, wherein the step of inputting comprises the second party inputting a series of responses in response to voice prompts.

13. The method of claim 8, wherein the step of inputting information comprises the second party communicating with a help desk of the call-processing system.

14. The method of claim 13, wherein the help desk comprises a live operator.

15. The method of claim 13, wherein the help desk comprises an automated system.

16. A method for monitoring environmental conditions of a first party through one or more of a first party's plurality of communication devices comprising:
   linking an environmental sensor to one of the first party's plurality of communication devices;
   establishing an individual user account for the first party on a call-processing system, the call-processing system having a central server and being operably coupled to the first party's plurality of communication devices;
   granting a second party access to the first party's account, wherein the second party comprises a caregiver associated with the first party and wherein access to the first party's account is restricted to only persons granted authority by the first party or the second party;
   receiving information from the second party at a central server of the call-processing system, wherein the information comprises configuration parameters to be applied to current features of the one or more of the first party's plurality of communication devices or the environmental sensor;

transmitting the information from the central server to one or more of the first party's plurality of communication devices or the environmental sensor to update the information contained on one or more of the first party's plurality of communication devices or the environmental sensor;

wherein the first party's user account includes information regarding one or more emergency contact parties;

inputting information from the environmental sensor to the central server of the call-processing system; and sending an alert from the central server to one or more of the first party's plurality of communication devices and to one or more of the emergency contact parties upon detection by the environmental sensor of an adverse event;

wherein the first party's plurality of communication devices are selected from the group consisting of corded telephones, cordless telephones, answering machines, cellular phones, personal digital assistants, wristwatches, pagers, and clock radios.

17. The method of claim 16, further comprising:

granting a primary emergency contact party access to the first party's account; and inputting information from primary emergency contact party to the central server, wherein said information includes parameters for receiving alerts.

18. The method of claim 16, wherein one of the emergency contact parties is a caregiver.

19. The method of claim 16, wherein the step of sending comprises sending an alert to a first one of the first party's plurality of communication devices and sending the alert to a second one of the first party's plurality of communication devices if confirmation is not received from the first party within a predetermined period of time.

20. The method of claim 19, further comprising the step of transmitting an alert to a second party if confirmation is not received from the first party within a predetermined period of time.

21. The system of claim 16, wherein the environmental sensor comprises a smoke detector.

22. The system of claim 16, wherein the environmental sensor comprises a video camera.

23. The system of claim 16, wherein the environmental sensor comprises a motion detector.

24. The system of claim 16, wherein the environmental sensor comprises a carbon monoxide detector.

* * * * *